March 29, 1932. F. W. ALLEN 1,851,231
HANDLE STRUCTURE
Filed Jan. 19, 1929
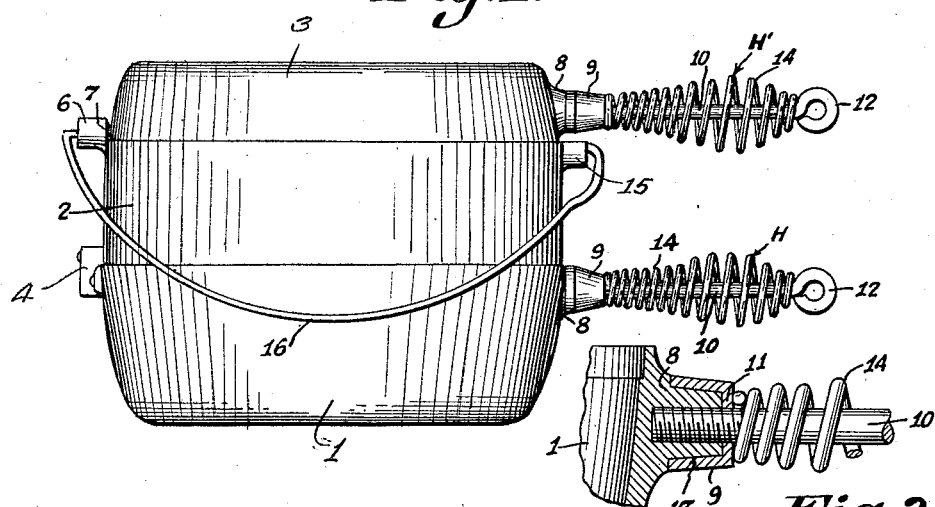
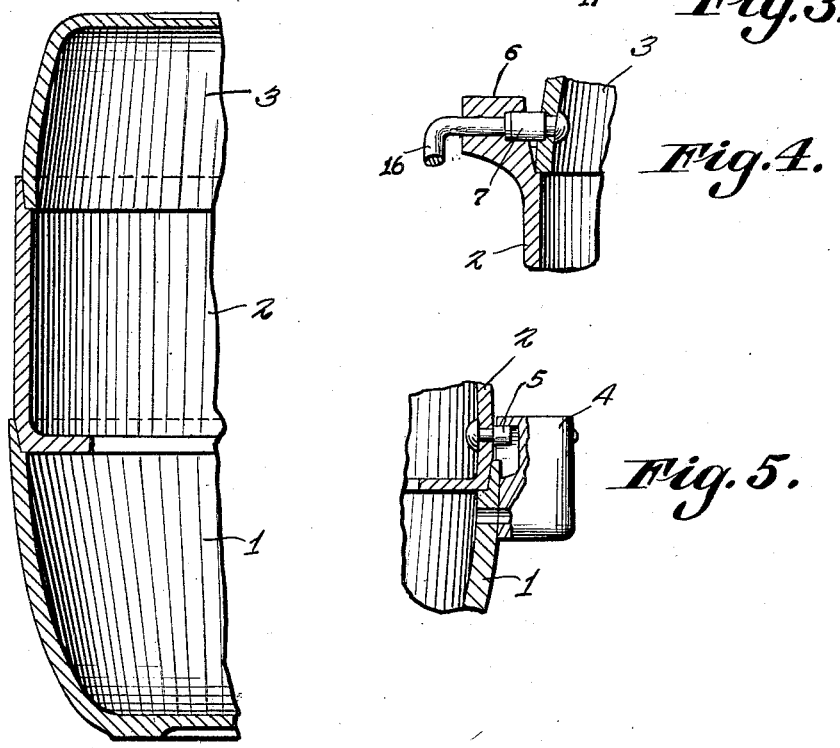
F. W. Allen
Inventor
By C. A. Snow & Co.
Attorneys.

Patented Mar. 29, 1932

1,851,231

UNITED STATES PATENT OFFICE

FRED W. ALLEN, OF KINGSTON, TENNESSEE, ASSIGNOR TO J. E. TATE, OF MIDDLETON, GEORGIA

HANDLE STRUCTURE

Application filed January 19, 1929. Serial No. 333,657.

This invention aims to provide a novel handle structure for domestic cooking utensils, and this application is based on matter divided out of my prior application No. 252,514, filed on February 7, 1928.

It is within the province of the disclosure to improve generally and to enhance the utility of devices of that type to which the present invention appertains.

With the above and other objects in view, the invention consists in the novel construction and arrangement of parts hereinafter described and claimed, it being understood that, within the scope of what is claimed, a mechanic may make such changes as his skill may suggest without departing from the spirit of the invention.

In the accompanying drawings:—

Figure 1 shows in side elevation, a device constructed in accordance with the invention;

Figure 2 is a fragmental transverse section of the article shown in Figure 1;

Figure 3 is a sectional view disclosing a part of the handle;

Figures 4 and 5 are sectional views showing parts of the elements which hold the members of the utensil together.

In the drawings there is shown a domestic cooking vessel comprising a cup shaped base 1 in which is seated an intermediate ring 2. An inverted cup shaped lid 3 is seated in the ring 2. The base 1 is provided with an outstanding lug 4, which detachably receives a stud 5 carried by the ring 2.

There is a lug 6 on the ring 2, and this lug detachably receives a stud 7 on the lid 3.

The base 1 has an outstanding tapered boss 8 which is circular in cross section. The numeral 9 designates a cap having an end wall 11, the cap being provided with a recess 17 which is shaped to conform to the boss 8, the cap receiving the boss. The base 1 has a handle H. The numeral 10 designates a rod, forming a member of the handle H, the member 10 being threaded into the end wall 11 of the cap 9, and being threaded into the boss 8 to bind the boss tightly in the recess 17 of the cap 9. At its outer end, the rod 10 has a projection 12 in the form of an eye. On the rod 10 is mounted a grip 14 of any desired shape and construction. In the present embodiment of the invention the grip is of spiral form. The grip 14 is engaged at one end by the eye or projection 12, and is engaged at its opposite end by the wall 11 of the cap 9. The general construction is such that an unusually strong handle mounting is provided. The lid 3 is supplied with a handle H' which is constructed and mounted like the handle H on base 1. There is a lug 15 on the ring 2, the lug 15 being disposed opposite to the lug 6. A bail 16 is pivotally mounted at its ends in the lugs 15 and 6 and constitutes a means whereby the ring 2 may be handled conveniently.

What is claimed is:—

A handle for cooking utensils and the like, which have a reduced, outstanding boss with a smooth external surface and a threaded axial bore, the handle being made up of a rod having a threaded inner end, and an enlargement at its outer end, a removable grip on the rod, the enlargement being of greater diameter than the outer end of the grip, the grip being abutted at its outer end against the enlargement, and a hollow, cup-shaped cap provided with an end wall threaded on the inner end of the rod, the cap being adjustable along the threaded end of the rod, to cause the end wall to engage the inner end of the grip and bind the outer end of the grip against the enlargement, the cap being open, after the cap has been threaded against the grip, thereby to leave the cap in condition to receive the boss, and the threaded inner end of the rod projecting into the cap, for reception in the axial bore of the boss.

In testimony that I claim the foregoing as my own, I have hereto affixed my signature.

FRED W. ALLEN.